Aug. 17, 1926.
F. W. ROLLER
1,596,626
ELECTRICAL MEASURING INSTRUMENT
Filed Nov. 2, 1920
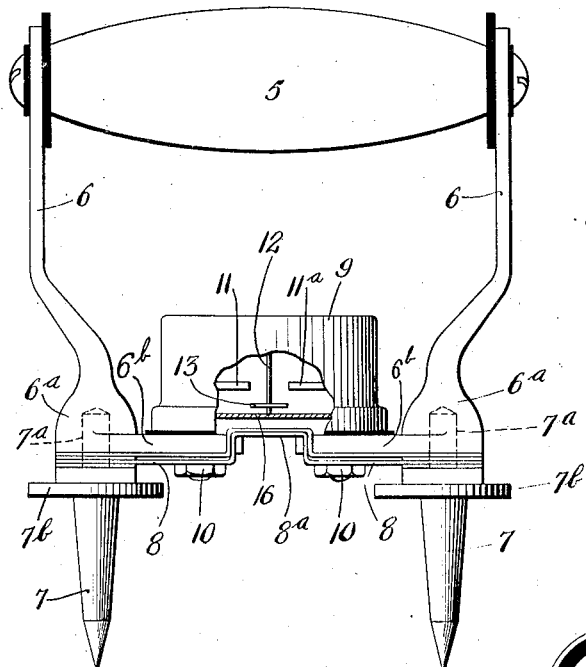
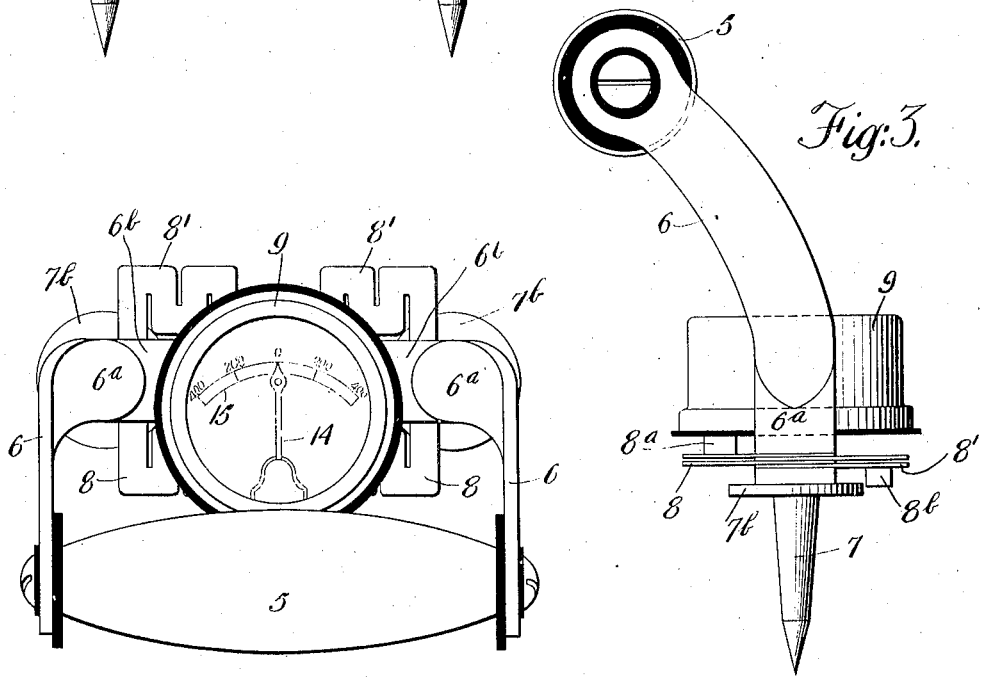

Patented Aug. 17, 1926.

1,596,626

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL MEASURING INSTRUMENT.

Application filed November 2, 1920. Serial No. 421,321.

This invention relates to electrical indicating or measuring instruments, the particular application of the form of my invention herewith shown and described being for the testing of storage battery cells for determining their condition or degree of charge.

One object of my invention is to produce a simple and reliable testing device for batteries and which may be conveniently and rapidly used for such purpose. Another object is to produce a testing instrument for this purpose which is rugged in construction and well adapted for comparatively rough usage without breakage or derangement of the parts. Another object is to produce a form of construction which may be economically manufactured and assembled.

Other objects and advantages of my invention will be understood from the following description and accompanying drawings which illustrate one embodiment of my invention.

Fig. 1 is a front elevation with certain parts broken away; Fig. 2 is a plan view; and Fig. 3 is a side elevation.

The instrument has a handle 5, preferably of insulating material, but in any case insulated from the side pieces 6. Side pieces extend downwardly in an inclined direction and have formed at their lower ends circular portions 6ª and plates or lugs 6ᵇ extending toward each other but leaving a space between the ends of these plates, as shown in Fig. 1. Below the portions 6ª are two downwardly extending pointed feet or prods 7 which have screws 7ª at the upper ends which engage the portions 6ª of the side pieces. The feet or prods 7 have circular flanges 7ᵇ near their upper ends which serve as radiating flanges to assist in dissipating the heat generated in the resistance conductors of the instrument.

Between the feet 7 and the side pieces are clamped the ends of resistance strips 8, 8', the ends of the strips thus having electrical connection with the feet 7. These resistance strips are of zig-zag shape. The strips 8, 8' extend outwardly from their connections at the ends and then continue in zig-zag shape at opposite sides of the device as shown in Fig. 2. The middle portion of strip 8 is bent so that a portion 8ª is in a plane above the rest of the strip 8, as shown in Fig. 1. An instrument 9 is located and supported on the lugs 6ᵇ, but electrically insulated therefrom, the bolts 10 serving to connect the instrument mechanically with the lugs but the bolts being suitably insulated so that no current passes between the lugs through the instrument casing. The instrument is indicated as being of the magnetic type having a permanent magnet with poles 11, 11ª. The shaft 12 of the instrument is suitably pivotally mounted and carries a magnetic element 13 subjected to the field of the permanent magnet and thus normally serves to hold the indicating needle 14 at the zero or central position of the scale plate 15. The instrument is indicated as having an inwardly displaced base plate 16 of non-magnetic material, the shaft 12 in this instance having one of its pivot bearings thereon.

The magnetic element 13 is shown located below the poles 11, 11ª of the permanent magnet and is thus subjected to the stray field of the magnet. When current passes through the resistance strip 8 and thus passes through the portion 8ª, a deflecting field, due to this current in the portion 8ª, is set up to which the magnetic element 13 is subjected and which is deflected in one direction or the other, depending on the direction of current through the portion 8ª of the strip, and is also deflected to an amount dependent upon the value of the current passing through the resistance strip.

When using the device, the operator presses the feet or prods 7 into engagement with the leaden posts forming the terminals of a storage battery cell, doing this rapidly and conveniently by means of the handle 5. Current then passes through the resistance strip 8 giving a deflection of the needle 14 depending upon the extent to which the battery or cell is charged. In this particular instance the cross-section and length of the resistance strips 8, 8' are such that with the usual battery cell such as is supplied with the electric system of a gasoline driven automobile, an amount of current will flow to produce a good deflection of the instrument, if the cell is fully charged, indicating nearly 400 amperes in the case of the usual cell of an automobile storage battery when fully charged. If the cell is not fully charged, the deflection will be correspondingly less, thus informing the user of the condition of the cell. It is evident that the device is adapted for convenient and rapid use by the operator, being easily applied to the battery posts and insuring adequate electrical connection therewith.

In this instance the resistance strip 8' is in shunt with the strip 8 and is shown as extending to the rear of the side pieces so as to be offset at the rear of the instrument. For convenience in manufacturing, strips 8, 8' are duplicates of each other, the side portion 8$^b$ of strip 8', being preferably located below the plane of the strip 8', since this portion 8$^b$ performs no function in the deflection of the instrument, the portion 8' being used for suitable adjustment of the amount of current flowing through the resistance strip 8. In some cases the strip 8' may not be necessary and in some cases additional shunting strips may be provided; and the strips may be variously shaped and adjusted as to length and cross-section so as to give the proper indication as to the degree to which the battery or cell is charged.

The resistance strip or strips are obviously well adapted to rapidly dissipate the heat due to passage of the current being well exposed to the surrounding air, and the flanges 7$^b$ also assist in the dissipation of the heat. Additional flanges may be provided on the feet 7 if desired and radiating flanges may also be provided on the resistance strips if desired or necessary for the dissipation of the heat.

It is evident that the device is adapted for economical manufacture and may be conveniently assembled, and by reason of the conducting strip 8 and portion 8$^a$ being external to the casing of the instrument, it enables the instrument to be separately assembled and afterwards merely secured in position on the lugs 6$^b$, and thus automatically brings the portion 8$^a$ in proper relation to the magnetic element 13. It will also be noted that the handle 5, by reason of being offset, renders the instrument plainly visible to the user so that a reading may be easily and quickly taken.

Although I have illustrated one embodiment of my invention various modifications may be made, as well as other applications thereof, without departing from the scope of my invention.

I claim:—

1. An electrical testing device having a casing, a movable element within the casing, means within the casing for causing said element to assume its normal position, means external to the casing for causing said element to be deflected, a support for said casing and said external means for securing an operative relation between said element and said external means, and a pair of contact making projections connected with said external means.

2. An electrical testing device having a casing, a movable element within the casing, means within the casing for causing said element to assume its normal position, a current carrying conductor without the casing for causing the deflection of said element, a support for said casing and said conductor for securing an operative relation between said casing and said conductor, and a pair of contact making projections connected with said conductor.

3. An electrical testing device having a casing, a movable magnetic element within the casing, a permanent magnet within the casing for causing said element to assume normal position, a current carrying conductor without the casing for deflecting said magnetic element upon the passage of current through said conductor, a support for said casing and said conductor for securing an operative relation between said casing and said conductor, and a pair of contact making projections connected with said conductor.

4. In an electrical testing device having a pair of side frames, contact making projections extending therefrom, an indicating element supported from said side frames, and an exposed conductor for causing deflection of said instrument upon the passage of current therethrough, said conductor having an electrical connection with said contact projections.

5. In an electrical testing device, a pair of side frames, a handle between said side frames, a pair of contact making projections supported by said side frames, an indicating instrument supported from said side frames, a conductor extending between said side frames, and in an electrical connection with said contact projections, a portion of said conductor being related to the movable element of said instrument for causing deflection thereof upon the passage of current through the conductor.

6. In an electrical testing device, a pair of side frames, a handle between said side frames, a pair of contact making projections supported by said side frames, an indicating instrument supported from said side frames, a conductor extending between said side frames and in an electrical connection with said contact projections, a portion of said conductor being related to the movable element of said instrument for causing deflection thereof upon the passage of current through the conductor, said handle being offset with relation to said instrument and with relation to said contact making projections.

7. In an electrical testing device, a frame, a pair of contact making projections supported thereby, an indicating instrument supported thereby having a casing, an exposed conductor outside said casing extending between said contact projections and electrically connected therewith, a portion of said conductor being so related to the movable element of said instrument as to cause deflection thereof upon the passage of current through said conductor.

FRANK W. ROLLER.